(12) United States Patent
Lacey et al.

(10) Patent No.: US 8,958,183 B2
(45) Date of Patent: Feb. 17, 2015

(54) INDUSTRIAL GROUND FAULT CIRCUIT INTERRUPTER

(71) Applicants: Darron Lacey, Fayetteville, GA (US);
Luis F. Salas, Fayetteville, GA (US);
Carlos Eduardo Restrepo, Atlanta, GA (US)

(72) Inventors: Darron Lacey, Fayetteville, GA (US);
Luis F. Salas, Fayetteville, GA (US);
Carlos Eduardo Restrepo, Atlanta, GA (US)

(73) Assignee: Cooper Technologies Company, Houston, TX (US)

( * ) Notice: Subject to any disclaimer, the term of this patent is extended or adjusted under 35 U.S.C. 154(b) by 59 days.

(21) Appl. No.: 13/692,420

(22) Filed: Dec. 3, 2012

(65) Prior Publication Data

US 2014/0153144 A1    Jun. 5, 2014

(51) Int. Cl.
*H02H 3/00* (2006.01)
*H02H 1/00* (2006.01)

(52) U.S. Cl.
CPC .................................. *H02H 1/0007* (2013.01)
USPC ............................................... 361/45; 361/42

(58) Field of Classification Search
USPC ....................................................... 361/42, 45
See application file for complete search history.

(56) References Cited

U.S. PATENT DOCUMENTS

| | | | |
|---|---|---|---|
| 6,327,124 B1 * | 12/2001 | Fearing et al. | 361/31 |
| 7,558,031 B2 * | 7/2009 | Boren | 361/23 |
| 7,936,543 B2 * | 5/2011 | Restrepo et al. | 361/42 |

* cited by examiner

*Primary Examiner* — Dharti Patel
(74) *Attorney, Agent, or Firm* — King & Spalding LLP (57) ABSTRACT

The present disclosure provides an industrial GFCI for control panels and/or industrial machines. The industrial GFCI senses when a fault condition has occurred in an associated circuit or load and quickly disconnect the circuit. In some exemplary embodiments, the industrial GFCI includes a bypass switch, which couples a load directly to a power source, bypassing fault detection. In some exemplary embodiments, the industrial GFCI also includes intelligent filtering, which discriminate between true fault events and false signals caused by environmental noise. Further, the industrial GFCI is manufactured as a part of a control panel or a piece of equipment. In certain exemplary embodiments, the industrial GFCI is manufactured as a portable kit capable of coupling to and decoupling from one or more control panels, machines, etc.

18 Claims, 4 Drawing Sheets

INDUSTRIAL GROUND FAULT CIRCUIT INTERRUPTER

TECHNICAL FIELD

The present invention relates generally to electrical devices and more particularly, to a ground fault circuit interrupter for industrial control panels.

BACKGROUND

In many industrial environments, certain machines or equipment may malfunction or stop working. In order to fix the equipment, an operator may first need to diagnose the equipment to find out which part of the machine or equipment is causing the malfunction. In certain cases, the cause of the malfunction may be identified visually, such as a loose connection, corrosion, broken part, etc. However, in many situations, the root cause of the malfunction may not be visually identifiable. In such situations, the operator may be required to test parts of the machine with a voltmeter while the machine is powered on in order to find out where the circuit fails. However, if the operator were to accidentally touch a conductive part of the machine, such as a hot wire or a contact, the voltage from the machine may pass through the operator to ground, resulting in potential injury to the operator. In certain situations, the operator may be holding a conductive tool, such as a wrench, which may also accidentally make contact with a conductive element of the machine, and allow voltage to pass through to the operator. As such, operators may often face risk when diagnosing, fixing, or maintaining such machines and equipment without fault protection.

SUMMARY

An exemplary embodiment of the present invention includes an industrial ground fault circuit interrupter (GFCI). The industrial GFCI includes a fault detection module for detecting a fault in a circuit, the circuit including a load and a power source, a power disconnect switch electrically coupled between the power source and the load, in which the power disconnect switch electrically decouples the load from power source when the fault detection module detects a fault in the circuit, and a bypass switch electrically coupled between the power source and the power disconnect switch, the bypass switch being positionable in a first state and a second state. In the first state, the bypass switch electrically couples the power source directly to the load, and in the second state, the bypass switch electrically couples the power source to the power disconnect switch. The fault detection module is communicably coupled to the power disconnect switch and detects a differential current between the power disconnect switch and the bypass switch via a current detecting device.

Another exemplary embodiment of the present invention includes an industrial ground fault circuit interrupter (GFCI). The industrial GFCI includes a portable industrial GFCI. The portable industrial GFCI is capable of being coupled to and decoupled from a control panel or equipment, in which the portable industrial ground fault circuit interrupter is electrically coupled between a power source and a load when it is coupled to the control panel or equipment. The portable GFCI further includes a fault detection module for detecting a fault in a circuit including the load and the power source, a power disconnect switch electrically coupled between the power source and the load, in which the power disconnect switch electrically decouples the load from the power source when the fault detection module detects a fault in the circuit. The fault detection module is communicably coupled to the power disconnect switch and detects a differential current between the power disconnect switch and the power source via a current detecting device. The portable GFCI further includes a housing. The housing stores the fault detection module and the power disconnect switch as a portable unit capable of being coupled to and decoupled from the control panel or equipment.

Another exemplary embodiment of the present invention includes an industrial ground fault circuit interrupter (GFCI). The industrial GFCI includes a fault detection module configured to detect a fault in a circuit, the circuit including a load and a power source. The industrial GFCI further includes a power disconnect switch communicably coupled to the fault detection module, in which the power disconnect switch is electrically coupled between the power source and the load, and decouples the load from power source when the fault detection module detects a fault in the circuit.

BRIEF DESCRIPTION OF THE DRAWINGS

The foregoing and other features and aspects of the invention are best understood with reference to the following description of certain exemplary embodiments, when read in conjunction with the accompanying drawings, wherein.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles.

BRIEF DESCRIPTION OF EXEMPLARY EMBODIMENTS

The exemplary embodiments of the present invention are directed to an industrial ground fault circuit interrupter (GFCI). The industrial GFCI senses when a fault condition has occurred in a circuit and quickly disconnects the circuit, minimizing injury and/or damage. Exemplary embodiments of the industrial GFCI include intelligent signal filtering, which works to discriminate between true fault events and signals caused by environmental noise. Further, in certain exemplary embodiments, the industrial GFCI is manufactured as a part of a control panel or a piece of equipment. However, in certain exemplary embodiments, the industrial GFCI is manufactured as a portable kit capable of being used with several control panels or machines. Although only a representative sample of exemplary embodiments and features of the industrial GFCI is provided herein for sake of brevity, the industrial GFCI is not limited to the exemplary embodiments and features explicitly detailed in this disclosure. The exemplary embodiments of the invention is better understood by reading the following description of non-limiting, exemplary embodiments with reference to the attached drawings, wherein like parts of each of the figures are identified by like reference characters, and which are briefly described as follows.

Figure 1:
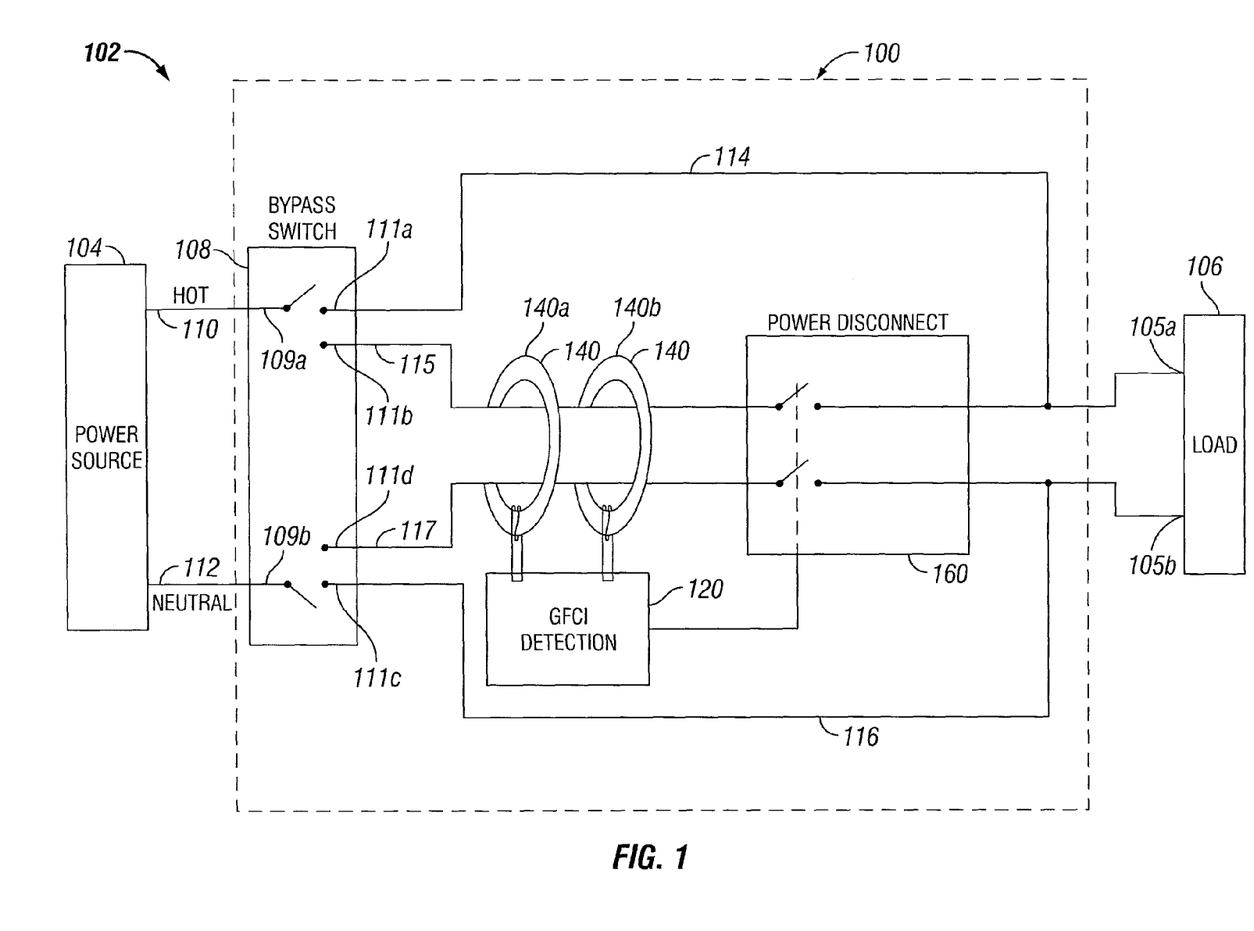
FIG. 1 is schematic diagram of an industrial GFCI coupled between a power source and a load, in accordance with an exemplary embodiment of the present invention.

FIG. 1 is a schematic view of an industrial GFCI 100 coupled between a power source 104 and a load 106, in accordance with an exemplary embodiment of the present invention. The industrial GFCI 100 of FIG. 1 represents a single-phase system according to certain exemplary embodiments; however, multi-phase systems are supported in other exemplary embodiments. Referring to FIG. 1, an industrial circuit 102 includes the industrial GFCI 100. The industrial circuit 102 further includes the power source 104, such as an AC power source, and the load 106. The industrial GFCI 100 is coupled between the power source 104 and the load 106 such that the load 106 is coupled to the power source 104 via the industrial GFCI 100. For example, the load 106 includes, but is not limited to, any of an industrial machine, a tool, an equipment, a control panel, and so forth. In certain exemplary embodiments, and as illustrated, the industrial GFCI 100 includes a bypass switch 108, a GFCI detection module 120, and a power disconnect switch 160. In the illustrated exemplary embodiment, the bypass switch 108 is a double pole double throw (DPDT) style switch. Thus, the bypass switch 108 includes a first pole contact 109a and a second pole contact 109b. The first pole contact 109a corresponds to a first pole first throw contact 111a and a first pole second throw contact 111b, such that when the bypass switch 108 is in a first position, the first pole contact 109a is conductively coupled to the first pole first throw contact 111a. When the bypass switch 108 is in a second position, the first pole contact 109a is conductively coupled to the first pole second throw contact 111b. Likewise, the second pole contact 109b corresponds to a second pole first throw contact 111c and a second pole second throw contact 111d. Thus, when the bypass switch 108 is in the first position, the second pole contact 109b is conductively coupled to the second pole first throw contact 111c, and when the bypass switch 108 is in the second position, the second pole contact 109b is conductively coupled to the second pole second throw contact 111d. The first pole contact 109a of the bypass switch 108 is electrically coupled to a power source hot wire 110 from the power source 104. The second pole contact 109b is electrically coupled a power source neutral wire 112 from the power source 104. The first pole first throw contact 111a is electrically coupled to a load hot wire 114, and the second pole first throw contact 111c is electrically coupled to a load neutral wire 116. The load hot wire 114 and load neutral wire 116 are respectively coupled to a hot terminal 105a and a neutral terminal 105b of the load 106. Thus, when the bypass switch 108 is in the first position, the power source hot wire 110 is electrically coupled to the load hot wire 114, and the power source neutral wire 112 is electrically coupled to the load neutral wire 116, thereby completing a circuit between the power source 104 and the load 106 and energizing the load 106.

The first pole second throw contact 111b of the bypass switch 108 is electrically coupled to a GFCI hot wire 115, and the second pole second throw contact 111d is electrically coupled to a GFCI neutral wire 117. The GFCI hot wire 115 and the GFCI neutral wire 117 are electrically coupled to the power disconnect switch 160. Thus, when the bypass switch 108 is in the second position, the power source hot wire 110 and the power source neutral wire 112 are electrically coupled to the power disconnect switch 160. The power disconnect switch 160 is further coupled to the load hot wire 114 and the load neutral wire 116. When the bypass switch 108 is in the second position and the power disconnect switch 160 is in a closed position, the power source hot wire 110 is electrically coupled to the load hot wire 114 via the GFCI hot wire 115 and the power disconnect switch 160, and the power source neutral wire 112 is electrically coupled to the load neutral wire 116 via the GFCI neutral wire 117 and the power disconnect switch 160, thereby completing a circuit from the power source 104 to the load 106. Thus, the load 106 is energized through the power disconnect switch 160. Alternatively, when the bypass switch 108 is in the second position and the power disconnect switch 160 is in an open position, the power source hot wire 110 is electrically decoupled from the load hot wire 114, and the power source neutral wire 112 is electrically decoupled from the load neutral wire 116. Thus, current does not flow from the power source 104 to the load 106 and therefore the load is de-energized.

In certain exemplary embodiments, the power disconnect switch 160 operates and is placed into an open position when it receives a disconnect signal from the GFCI detection module 120. The GFCI detection module 120 is configured to detect if a fault condition has occurred in the industrial circuit 102, such as at the load 106. In certain exemplary embodiments, the GFCI detection module 120 is coupled to one or more transformers 140. Each transformer 140 is disposed around the GFCI hot wire 115 and the GFCI neutral wire 117. At least one of the transformers 140 is a differential transformer 140a. The differential transformer 140a is configured to send a signal to the GFCI detection module 120 indicative of a difference between the current in the GFCI hot wire 115 and the current in the GFCI neutral wire 117. In certain exemplary embodiments, a difference between the current in the GFCI hot wire 115 and the current in the GFCI neutral wire 117, also known as a differential current, is indicative of a fault event. As such, when a differential current is detected by the GFCI detection module 120 which is greater than a preset differential current threshold, the GFCI detection module 120 sends a disconnect signal to the power disconnect switch 160. In certain exemplary embodiments, the differential current threshold is about 4 milliamps ("mA"). However, in other exemplary embodiments, the differential current threshold is either higher or lower than 4 mA depending upon the application and/or user preferences. The disconnect signal actuates the power disconnect switch 160 and places the power disconnect switch 160 in the open position, thereby electrically decoupling the load 106 from the power source 104.

In certain exemplary embodiments, and as discussed above, the bypass switch 108 may be placed into the first position, in which the power source 104 is directly coupled to the load 106, or the second position, in which the power source 104 is only coupled to the load 106 through the power disconnect switch 160. In certain exemplary embodiments, the bypass switch 108 is placed into the first position when the load 106 and/or industrial circuit 102 is working under normal conditions and does not require user interaction on the electrical level. In such situations, it may be advantageous for the power disconnect switch 160 to be bypassed. Thus, nuisance tripping may be avoided. In certain exemplary embodiments, the bypass switch 108 is placed into the second position when the load 106 and/or industrial circuit is being operated on by a user, such as during maintenance or trouble shooting. As the risk of electrical shock may be increased in such situations, it is advantageous for power to flow through the power disconnect switch 160 such that the circuit may be disconnected if a fault event were to occur. Thus, potential injury and/or damage from such fault events may be decreased or prevented.

Figure 2:
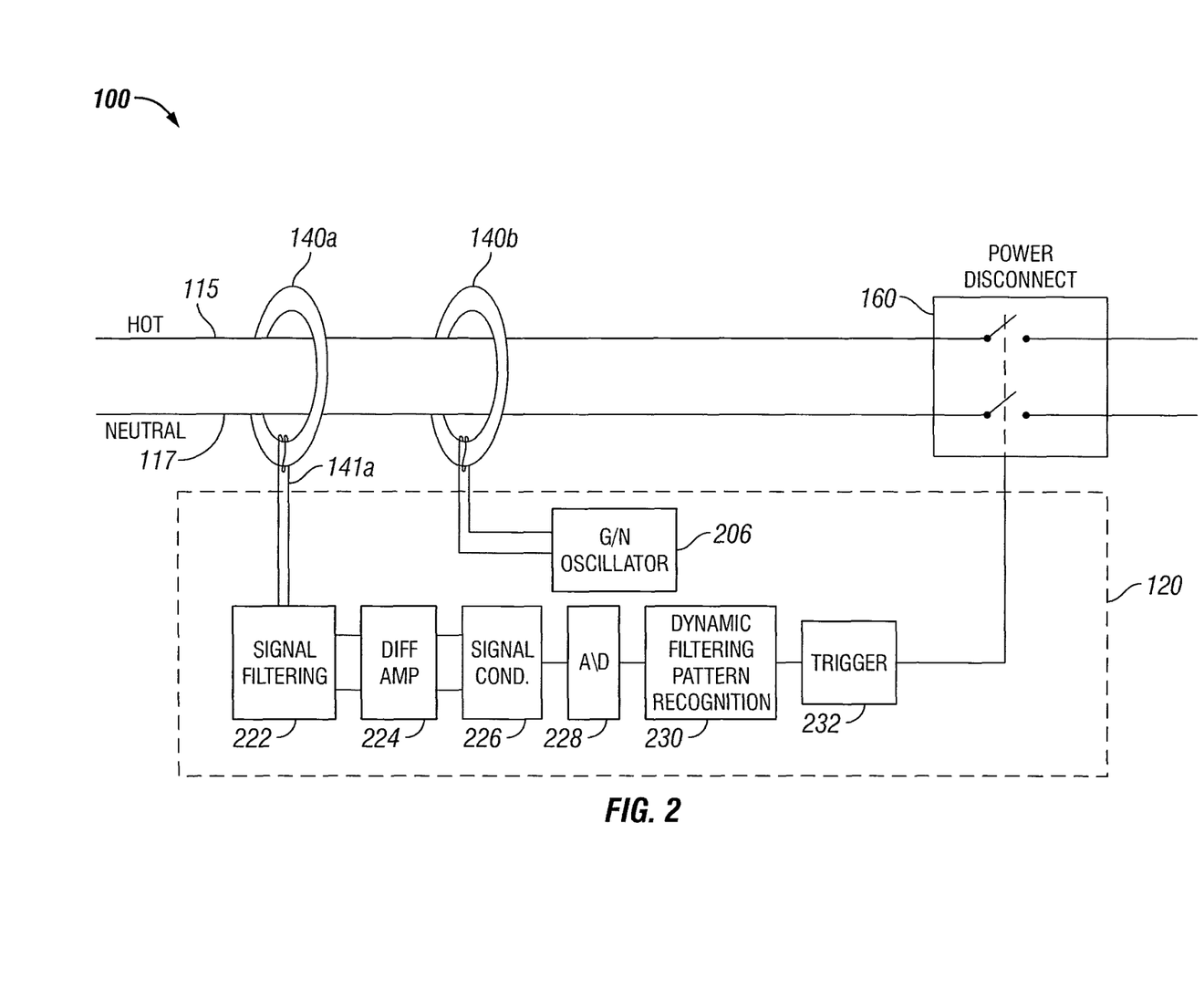
FIG. 2 is an schematic diagram of the industrial GFCI of FIG. 1 which illustrates an expanded block diagram of a GFCI detection module, in accordance with an exemplary embodiment of the present invention.

In certain environments, machines and other environmental disturbances also cause a differential current due to noise rather than a true fault event. Thus, in certain exemplary embodiments, the GFCI detection module 120 includes intelligent filtering means to distinguish between a true fault event and noise. FIG. 2 further illustrates an exemplary block diagram of the industrial GFCI having such intelligent filtering means, in accordance with aspects of the present disclosure. Referring to FIGS. 1 and 2, the GFCI detection module 120 further includes a signal filtering module 222, a differential amplifier 224, a signal conditioning module 226, an analog-to-digital converter 228, a dynamic filtering and pattern recognition module 230, and a trigger 232. In certain exemplary embodiments, the GFCI detection module 120 further includes a ground-to-neutral ("G/N") oscillator 206, which is described in further detail below. According to certain exemplary embodiments, the GFCI detection module 120 includes a variety of components and processes, which includes one or more of those mentioned above and/or additional components and/or alternate components configured in various combinations appropriate for carrying out the purposes of the GFCI detection module 120.

According to some exemplary embodiments, the differential transformer 140a is disposed around the GFCI hot wire 115 and the GFCI neutral wire 117. The differential transformer 140a is further coupled to the signal filtering module 222 via transformer coils 141a. The differential transformer 140a senses the difference between the current in the GFCI hot wire 115 and the current in the GFCI neutral wire 117, thereby measuring the net magnetic effect between the GFCI hot wire 115 and the GFCI neutral wire 117. Generally, when there is a current imbalance between the GFCI hot wire 115 and the GFCI neutral wire 117, also known as a differential current, a small amount of current is generated by the differential transformer 140a indicative of a potential fault event. The generated current is then sent to the signal filtering module 222 via the transformer coils 141a.

Accordingly, the signal filtering module 222 receives the current generated by the differential transformer 140a. The signal filtering module 222 is generally configured to attenuate at least some of the noise associated with the current in order to discriminate between a true fault event and electric noise generated by the machine and/or environment. In certain exemplary embodiments, the signal filtering module 222 uses a low-pass filter and/or a band-pass filter to filter out or eliminate certain DC and/or high frequency disturbances that are sent from the differential transformer 140a due to noise. In certain exemplary embodiments, the signal filtering module 222 acts as a first guard against potential noise from the differential transformer 140a that is not typical of a fault event.

After the current generated from the differential transformer 140a is passed through the signal filtering module 222, the resulting current is sent to the differential amplifier 224. Generally, the differential amplifier 224 converts the current into a corresponding voltage signal. In certain exemplary embodiments, the differential amplifier 224 also amplifies the voltage signal and sends it to the signal conditioning module 226.

The signal conditioning module 226 receives the amplified voltage signal from the differential amplifier 224, and then conditions the signal such that it is suitable for digital manipulation. In certain exemplary embodiments, the signal conditioning module 226 conditions the voltage signal by performing normalization, amplification, filtering, isolation, biasing, other signal conditioning processes, or a combination thereof. Proper conditioning of the voltage signal allows for the signal to be properly sampled and/or manipulated by subsequent digital processes. For example, the signal conditioning module 226 amplifies or biases the voltage signal such that the analog-to-digital ("A/D") converter 228 properly samples the full range of the signal. In certain exemplary embodiments, in order to intelligently discriminate between a true fault event and non-fault noise, the converted digital signal is further processed in a number of digital logic and/or software processes. As such, in certain exemplary embodiments, the analog voltage signal is conditioned in the signal conditioning module 226 before it is sent to the analog-to-digital (A/D) converter 228.

The analog-to-digital converter 228 receives the conditioned voltage signal from the signal conditioning module 226. The analog-to-digital converter 228 samples and digitizes the voltage signal to generate a representative digital signal. In certain exemplary embodiments, the analog-to-digital converter 228 digitizes the voltage signal with between eight bits to twelve bits. In certain embodiments, greater or fewer bits are used. In certain exemplary embodiments, the analog-to-digital converter 228 uses a sampling rate between approximately fifty kilohertz ("kHz") and 200 kHz, though other exemplary embodiments use lower or higher sampling rates. In certain exemplary embodiments, the analog-to-digital converter 228 encompasses the signal conditioning module 226 such that the analog-to-digital converter 228 both conditions the analog voltage signal and converts it into a digital signal.

In certain exemplary embodiments, the GFCI detection module 120 further includes the dynamic filtering and pattern recognition module 230. Generally, the dynamic filtering and pattern recognition module 230 receives the digital signal from the analog-to-digital converter 228 and further analyzes it to determine if the signal is that of a fault event or noise. Generally, the dynamic filtering and pattern recognition module 230 detects high frequency patterns, periodicity of the frequencies, and/or other patterns and attributes of the signal in order to make a determination between a true fault event and other conditions or disturbances. In certain exemplary embodiments, a number of decision-making algorithms and protocols are applied. Additionally, certain exemplary embodiments of the GFCI detection module 120 are configured to be relatively more or less sensitive in detecting a fault event. For example, in certain exemplary embodiments, the GFCI detection module 120 is configured to be relatively more sensitive such that it detects more non-fault noise as fault events than vice versa. When the dynamic filtering and pattern recognition module 230 processes the digital signal and determines that it is indicative of a true fault event, the dynamic filtering and pattern recognition module 230 sends a signal to the trigger 232. The trigger 232 then actuates the power disconnect switch 160, which disconnects the load 106 from the power source 104 via the power disconnect switch 160, opens the industrial circuit 102, and de-energizes the load 106. Thus, the load 106 becomes protected from the fault event. The dynamic filtering and pattern recognition module 230 is one of various modules designed to distinguish between a fault event and noise. For example, in certain exemplary embodiments, the GFCI detection module 120 includes a ground fault detection module (not shown). The ground fault detection module replaces or works in parallel with the dynamic filtering and pattern recognition module 230 to determine whether or not a fault event has occurred. If a ground fault has occurred, one or both the dynamic filtering and pattern recognition module 230 and the ground fault detection module generate a trigger signal that goes to the trigger 232 that ultimately actuates the power disconnect switch 160, which disconnects the load 106 from the power source 104 via the power disconnect switch 160, opens the industrial circuit 102, and de-energizes the load 106. Thus, the load 106 becomes protected from the fault event.

According to some exemplary embodiments, the industrial GFCI 100 further includes a ground-to-neutral ("G/N") transformer 140b. The ground-to-neutral transformer 140b also is disposed around the GFCI hot wire 115 and the GFCI neutral wire 117, and is coupled to the ground-to-neutral oscillator 206, which has previously been mentioned as being part of the GFCI detection module 120 according to certain exemplary embodiments. The ground-to-neutral oscillator 206 generally includes a ground loop detector configured to detect if a ground loop has been formed in the circuit. In certain circumstances, a fault event may cause a ground loop. However, the differential transformer 140a discussed above may not be able to detect a differential current between the GFCI hot wire 115 and the GFCI neutral wire 117 as current may be returning to the GFCI neutral wire 117 via ground even if a fault event has occurred. The ground loop detector is able to sense when a ground loop exists, which may be indicative of a fault event. The ground-to-neutral oscillator 206 generates a signal when a ground loop is detected by the ground loop detector. The signal generated by the ground-to-neutral oscillator 206 is sent to the ground-to-neutral transformer 140b, which produces a differential current signal. The differential current signal is then picked up by the differential transformer 140a as if there is a current imbalance between the GFCI hot wire 115 and the GFCI neutral wire 117. As such, the differential transformer 140a sends a current signal to the GFCI detection module 120 indicating a potential fault event.

Figure 3:
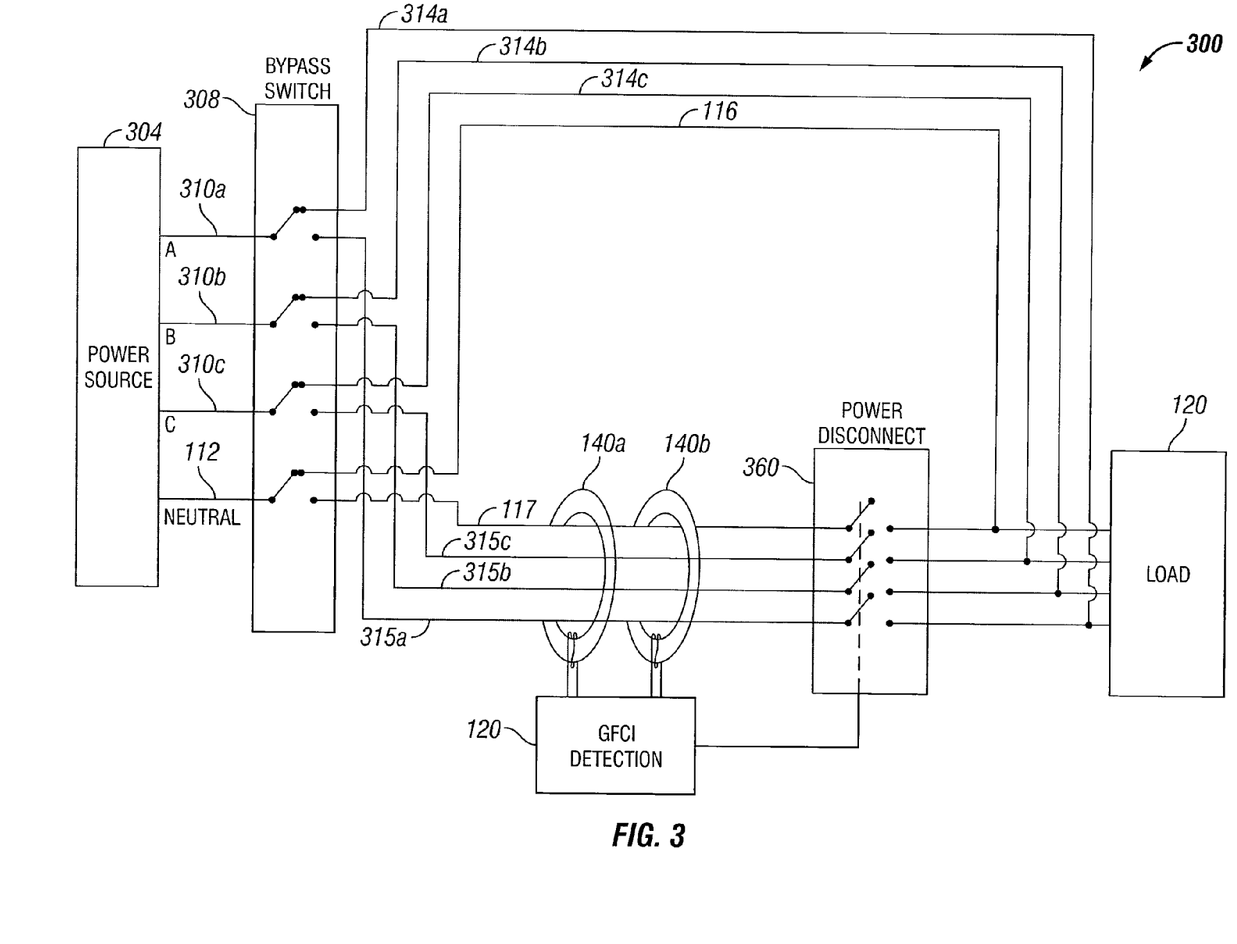
FIG. 3 is a block diagram of a three-phase industrial GFCI, in accordance with an exemplary embodiment of the present invention.

As previously mentioned, in certain exemplary embodiments, the industrial GFCI supports a multi-phase system. FIG. 3 is a schematic diagram of a three ("3")-phase industrial GFCI 300 coupled to a load 106, in accordance with another exemplary embodiment of the present invention. The 3-phase industrial GFCI 300 includes a 3-phase bypass switch 308, a first load hot wire 314a, a second load hot wire 314b, a third load hot wire 314c, the load neutral wire 116, a first GFCI hot wire 315a, a second GFCI hot wire 315b, a third GFCI hot wire 315c, the GFCI neutral wire 117, and a 3-phase power disconnect switch 360. The load hot wires 314a-314c and the GFCI hot wires 315a-315c are substantially similar to the load hot wire 114 and GFCI hot wire 115, respectively, of the single-phase industrial GFCI 100 embodied in FIG. 1. Thus, further detailed discussion of such is reserved for brevity. The 3-phase industrial GFCI 300 also includes the differential transformer 140a, the ground-to-neutral transformer 140b, and the GFCI detection module 120, which have been previously described in detail and are not repeated herein for the sake of brevity. When the bypass switch 308 is placed in a first position, a power source 304 is directly coupled to the load 106 without being coupled to the 3-phase power disconnect switch 360. Specifically, a first power source hot wire 310a is coupled to the first load hot wire 314a, a second power source hot wire 310b is coupled to the second load hot wire 314b, a third power source hot wire 310c is coupled to the third load hot wire 314c, and the power source neutral wire 112 is coupled to the load neutral wire 116. As such, the power disconnect switch 360 is bypassed and the load 106 is directly electrically coupled to the power source 304 when the bypass switch 308 is in the first position. Alternatively, when the bypass switch 308 is in the second position, the first power source hot wire 310a is coupled to the first GFCI hot wire 315a, the second power source hot wire 310b is coupled to the second GFCI hot wire 315b, the third power source hot wire 310c is coupled to the third GFCI hot wire 315c, and the power source neutral wire 112 is coupled to the GFCI neutral wire 117. The GFCI hot wires 315a, 315b, and 315c and the GFCI neutral wire 117 also are electrically coupled to the 3-phase power disconnect switch 360, which also is electrically coupled to the load hot wires 314a, 314b, and 314c and the load neutral wire 116. Thus, when the bypass switch 308 is in the second position and the 3-phase power disconnect switch 360 is in a closed position, the power source hot wires 310a, 310b, 310c and the power source neutral wire 112 are electrically coupled to the load hot wires 314a, 314b, 314c and the load neutral wire 116, respectively, via the 3-phase power disconnect switch 360. When the bypass switch 308 is in the second position and the 3-phase power disconnect switch 360 is in an open position, the power source hot wires 310a, 310b, 310c and the power source neutral wire 112 are electrically decoupled from the load hot wires 314a, 314b, 314c and the load neutral wire 116, respectively. The 3-phase power disconnect switch 360 is put into the open position when a potential fault event is detected by the GFCI detection module 120. Specifically, the differential transformer 140a generates a current if there is a current imbalance between the GFCI hot wires 315a, 315b, and 315c, and the GFCI neutral wire 117, which may indicate a current leak or fault event. The current generated by the differential transformer 140a is sent to the GFCI detection module 120, where it undergoes processing, digitization, and analysis (as discussed above) to determine whether a true fault event has occurred or if the current generated was a result of environmental noise. If the GFCI detection module 120 determines that a fault event has occurred, the GFCI detection module 120 sends a signal to the 3-phase power disconnect switch 360, placing the 3-phase power disconnect switch 360 in the open position. Thus, the load 106 is disconnected from the power source. The 3-phase industrial GFCI 300 operates substantially similarly to the single-phase industrial GFCI described above. As such, details of such are generally described above and are not repeated herein for the sake of brevity.

In certain exemplary embodiments, the industrial GFCI, such as industrial GFCI 100, 300 (FIGS. 1 and 3), is implemented as a built-in component of an industrial control panel or system. However, in certain alternative exemplary embodiments, the industrial GFCI, similar in concept to the industrial GFCI 100, 300 (FIGS. 1 and 3), is implemented as a portable and/or removable kit that is coupleable to a control panel when in use and removed when not in use. In such exemplary embodiments where the industrial GFCI is portable, the industrial GFCI includes a power source terminal (not shown) and a load terminal (not shown), configured to be coupled to power source wires and load wires of a control system, respectively. The industrial GFCI does not include a bypass switch, such as the bypass switch 108, 308 (FIGS. 1 and 3), in certain exemplary embodiments. In certain exemplary embodiments, the industrial GFCI is entirely removed from being coupled between the power source and the load, allowing the power source to be directly coupled to the load.

Figure 4:
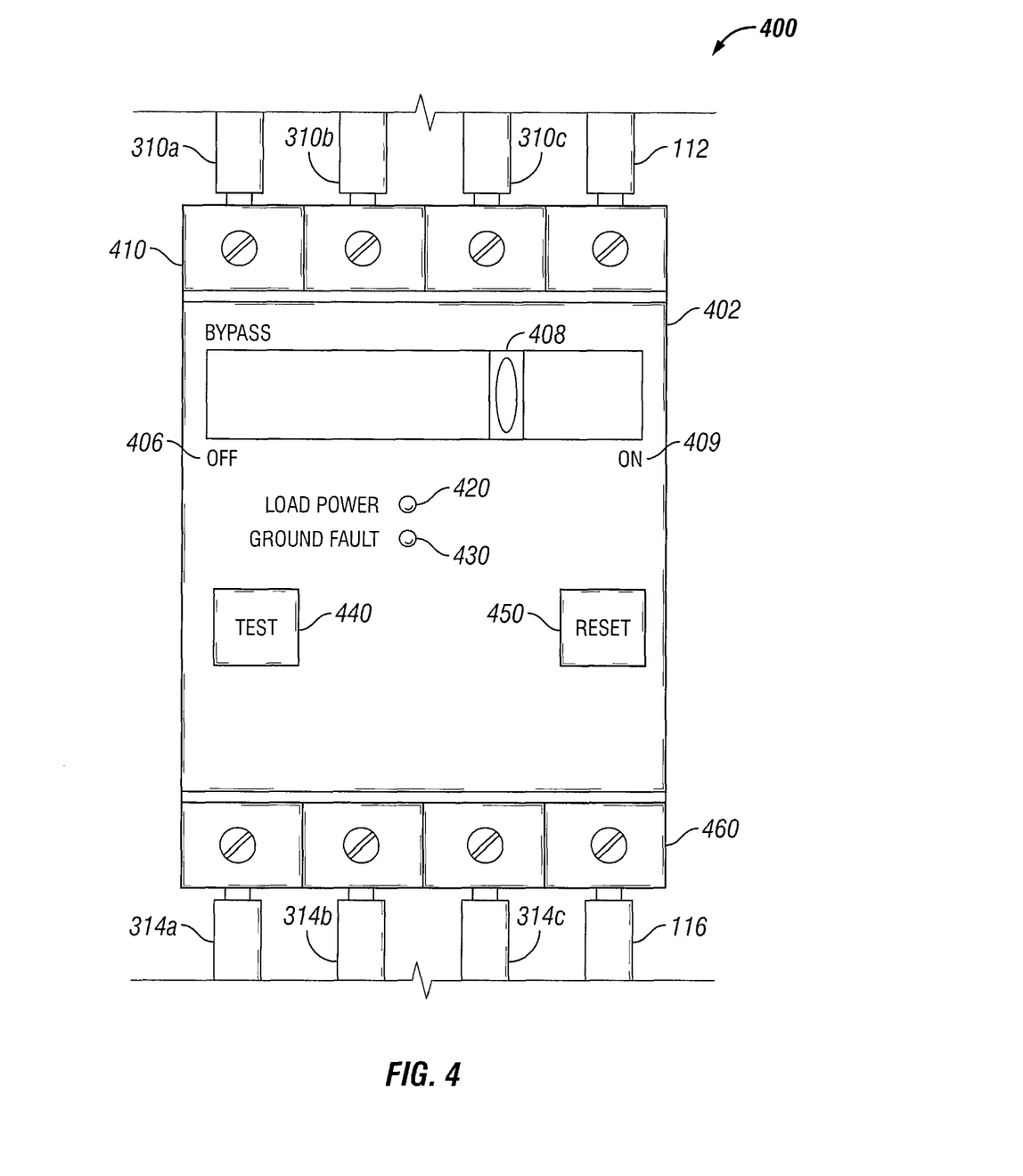
FIG. 4 is a representative illustration of an interface of the industrial GFCI, in accordance with an exemplary embodiment of the present invention.

FIG. 4 illustrates an exemplary embodiment of an interface 402 of the industrial GFCI 400, in accordance with exemplary embodiments of the invention. The industrial GFCI 400 depicts an exemplary embodiment of a portable industrial GFCI. The interface 402 includes a power source terminal block 410, a bypass switch interface 408, a load power indicator 420, a ground fault indicator 430, a test button 440, a reset button 450, and a load terminal block 460. In a 3-phase industrial GFCI 400, the power source terminal block 410 receives each of the first power source hot wire 310a, the second power source hot wire 310b, the third power source hot wire 310c, and the power source neutral wire 112. The power source terminal block 410 couples each of the first power source hot wire 310a, the second power source hot wire 310b, the third power source hot wire 310c, and the power source neutral wire 112 to the bypass switch interface 408. The bypass switch interface 408 may be put into an ON position 409 or an OFF position 406. When the bypass switch interface 408 is in the OFF position 409, the power source (not shown), similar to power source 104 (FIGS. 1 and 3), is coupled to the 3-phase power disconnect switch (not shown) enclosed within the interface 402, and similar to the 3-phase power disconnect switch 360 (FIG. 3). When the bypass switch interface 408 is in the ON position, the power source bypasses the 3-phase power disconnect switch and is directly coupled to the load (not shown), similar to the load 106 (FIGS. 1 and 3). In certain exemplary embodiments, the load power indicator 420 includes a light source, such as an light emitting diode ("LED"), that lights up when the load is electrically coupled to the power source and the load is energized. In certain exemplary embodiments, the ground fault indicator 430 includes a light source, such as an LED, that lights up when a fault event occurs. The test button 440 is pressed to test the industrial GFCI 400. In certain exemplary embodiments, when the test button 440 is pressed, a small ground fault is created to test if the 3-phase industrial GFCI 400 detects the fault and trips accordingly. The reset button 450 is pressed to reset the industrial GFCI 400 for initial use or after a fault event. The load terminal block 460 couples each of the first load hot wire 314a, the second load hot wire 314b, the third load hot wire 314c, and the load neutral wire 116 to both the 3-phase bypass switch as well as the power disconnect switch. Thus, the load is directly coupled to the power source when the bypass switch interface 408 is in the ON position 409. Alternatively, when the bypass switch interface 408 is in the OFF position 406, the load is coupled to the 3-phase power disconnect switch, which allows the load to be disconnected from the power source in the case of a fault event. According to certain other exemplary embodiments, the industrial GFCI 400 described above, or another exemplary embodiment of the industrial GFCI 400, is adapted for a single-phase industrial GFCI, similar to the single-phase industrial GFCI 100 but portable.

Although each exemplary embodiment has been described in detail, it is to be construed that any features and modifications that are applicable to one embodiment are also applicable to the other embodiments. Furthermore, although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. An industrial ground fault circuit interrupter (GFCI) comprising:
    a fault detection module for detecting a fault in a circuit, the circuit comprising a load and a power source;
    a power disconnect switch electrically coupled between the power source and the load, wherein the power disconnect switch electrically decouples the load from the power source when the fault detection module detects a fault in the circuit; and
    a bypass switch electrically coupled between the power source and the power disconnect switch in series, the bypass switch being positionable in a first state and a second state,
    wherein in the first state, the bypass switch electrically couples the power source directly to the load and decouples the power disconnect switch from the power source;
    wherein in the second state, the bypass switch electrically couples the power source to the power disconnect switch; and
    wherein the fault detection module is communicably coupled to the power disconnect switch and detects a differential current between the power disconnect switch and the bypass switch via a current detecting device.

2. The industrial ground fault circuit interrupter (GFCI) of claim 1, wherein the bypass switch is coupled to the power source via at least one power source hot wire and a power source neutral wire, and wherein the bypass switch is coupled to the power disconnect switch via at least one GFCI hot wire and a GFCI neutral wire.

3. The industrial ground fault circuit interrupter (GFCI) of claim 2, wherein the current detecting device comprises a differential transformer disposed around the at least one GFCI hot wire and the GFCI neutral wire, and wherein the differential transformer sends a signal to the fault detection module indicative of a differential current between the at least one GFCI hot wire and the GFCI neutral wire.

4. The industrial ground fault circuit interrupter (GFCI) of claim 2, comprising:
    a ground-to-neutral oscillator, the ground-to-neutral oscillator coupled to a transformer disposed around the at least one GFCI hot wire and the GFCI neutral wire,
    wherein the ground-to-neutral oscillator sends a signal to the transformer upon detecting a ground loop; and
    wherein the transformer causes a differential current between the at least one GFCI hot wire and the GFCI neutral wire upon receiving the signal.

5. The industrial ground fault circuit interrupter (GFCI) of claim 2, wherein the power source comprises a single-phase power source, one power source hot wire, and one GFCI hot wire.

6. The industrial ground fault circuit interrupter (GFCI) of claim 2, wherein the power source comprises a three-phase power source, three power source hot wires, and three GFCI hot wires.

7. The industrial ground fault circuit interrupter (GFCI) of claim 1, wherein the fault detection module further comprises:
    a signal filtering module, the signal filtering module receiving a differential current signal from the current detecting device and outputting a filtered signal;
    a differential amplifier, the differential amplifier receiving the filtered signal from the signal filtering module and outputting a corresponding voltage signal;

an analog-to-digital converter, the analog-to-digital converter receiving the voltage signal from the differential amplifier and outputting a digital signal;

a decision module, the decision module receiving the digital signal from the analog-to-digital converter and outputting a trigger signal when the digital signal surpasses a pre-set threshold; and a trigger, the trigger receiving the trigger signal from the decision module and actuating the power disconnect switch, decoupling the load from the power source.

8. The industrial ground fault circuit interrupter (GFCI) of claim 1, wherein the bypass switch, the fault detection module, and the power disconnect switch are installed within a control panel or equipment.

9. An industrial ground fault circuit interrupter (GFCI), comprising:

a portable industrial ground fault circuit interrupter (GFCI), the portable industrial ground fault circuit interrupter (GFCI) capable of being coupled to and decoupled from a control panel or equipment, wherein the portable industrial ground fault circuit interrupter is electrically coupled between a power source and a load when it is coupled to the control panel or equipment, the portable industrial ground fault circuit interrupter (GFCI) further comprising:

a fault detection module for detecting a fault in a circuit comprising the load and the power source;

a power disconnect switch electrically coupled between the power source and the load, wherein the power disconnect switch electrically decouples the load from the power source when the fault detection module detects a fault in the circuit;

a bypass switch electrically coupled between the power source and the power disconnect switch in series, wherein the bypass switch is positionable at a first state and a second state, wherein in the first state, the bypass switch electrically couples the power source directly to the load; and wherein in the second state, the bypass switch electrically couples the power source to the power disconnect switch, wherein the fault detection module is communicably coupled to the power disconnect switch and detects a differential current between the power disconnect switch and the power source via a current detecting device; and a housing, the housing storing the fault detection module and the power disconnect switch as a portable unit capable of being coupled to and decoupled from the control panel or equipment.

10. The industrial ground fault circuit interrupter (GFCI) of claim 9, wherein the power source comprises a single-phase power source.

11. The industrial ground fault circuit interrupter (GFCI) of claim 9, wherein the power source comprises a multi-phase power source.

12. The industrial ground fault circuit interrupter (GFCI) of claim 9, wherein the fault detection module is coupled to a differential transformer, the differential transformer configured to sense a differential current between the power source and the load.

13. An industrial ground fault circuit interrupter (GFCI), comprising:

a fault detection module configured to detect a fault in a circuit, the circuit comprising a load and a power source;

a power disconnect switch communicably coupled to the fault detection module, wherein the power disconnect switch is electrically coupled between the power source and the load, and decouples the load from power source when the fault detection module detects a fault in the circuit; and a bypass switch electrically coupled between the power source and the power disconnect switch in series, the bypass switch having a first position and a second position, wherein the bypass switch electrically couples the power source directly to the load and decouples the power disconnect switch from the power source in the first position, and electrically couples the power source to the power disconnect switch in the second position.

14. The industrial ground fault circuit interrupter (GFCI) of claim 13, wherein the fault detection module is coupled to a current detection device, the current detection device configured to detect a differential current between the power source and the load.

15. The industrial ground fault circuit interrupter (GFCI) of claim 13, wherein the fault detection module further comprises:

a signal filtering module, the signal filtering module receiving a differential current signal from the current detecting device and outputting a filtered signal;

a differential amplifier, the differential amplifier receiving the filtered signal from the signal filtering module and outputting a corresponding voltage signal;

an analog-to-digital converter, the analog-to-digital converter receiving the voltage signal from the differential amplifier and outputting a digital signal;

a decision module, the decision module receiving the digital signal from the analog-to-digital converter and outputting a trigger signal when the digital signal surpasses a pre-set threshold; and a trigger, the trigger receiving the trigger signal from the decision module and actuating the power disconnect switch, decoupling the load from the power source.

16. The industrial ground fault circuit interrupter (GFCI) of claim 13, wherein the power source is a single-phase power source.

17. The industrial ground fault circuit interrupter (GFCI) of claim 13, wherein the power source is a three-phase power source.

18. The industrial ground fault circuit interrupter (GFCI) of claim 13, wherein the fault detection module and the power disconnect switch are installed in a portable housing.

* * * * *